UNITED STATES PATENT OFFICE.

ALFRED R. CALDWELL, OF PASADENA, CALIFORNIA.

DRESSING FOR LEATHER AND LEATHER SUBSTITUTES AND PROCESS OF MAKING THE SAME.

1,338,286.  Specification of Letters Patent.  Patented Apr. 27, 1920.

No Drawing.   Application filed August 4, 1919.  Serial No. 315,334.

*To all whom it may concern:*

Be it known that I, ALFRED R. CALDWELL, a citizen of the United States, residing at Pasadena, in the county of Los Angeles and State of California, have invented new and useful Improvements in Dressing for Leather and Leather Substitutes and Processes of Making the Same, of which the following is a specification.

My invention relates to a liquid composition suitable for dressing automobile tops made of leather or artificial leather, and other articles made of leather and the like.

It is an object of this invention to provide a dressing which is easily applied to automobile tops and the like and which will form a durable finish, giving an appearance of newness thereto.

My invention consists in the composition and the process of compounding the same as hereinafter described and claimed.

The composition is compounded of the following ingredients, in the proportions stated:

One gallon asphaltum,
One gallon benzin,
One quart rubber cement,
One pound lamp black,
One-quarter pound beeswax, and one pint of Japan drier.

The composition is prepared as follows:

The asphaltum is heated in a steam jacketed container until fluid and the beeswax is dissolved therein, then the rubber cement, lamp black and Japan drier are added while the mixture is still hot, and thoroughly mixed therewith so as to form a homogeneous mixture. When the mixture is cold the benzin is added and the mixture stirred so as to form a thin varnish of uniform consistency.

In place of benzin, gasolene may be used. The rubber cement may be any rubber cement consisting of Pará rubber dissolved in a suitable solvent and having the consistency of varnish.

The leather or leather substitute articles to which my dressing is to be applied are first cleaned so as to remove the dust, and the dressing is applied with a brush. It dries quickly, being thoroughly dry in an hour, and forms a dust and water-proof coating having a bright luster, without, however, possessing a high gloss.

It is of course understood that the dressing is applied only to black leather and substitutes therefor.

I have found that the best results are obtained when the ingredients are compounded using the relative proportions as stated. However, good results are also obtained when the proportions are varied, as will be understood by those skilled in the art.

I claim:

1. A quickly drying liquid dressing for leather and the like comprising asphaltum, rubber cement, a black pigment, beeswax, Japan drier, and a relatively large quantity of volatile thinner.

2. A quickly drying liquid dressing for leather and the like comprising asphaltum, rubber cement, beeswax, and a relatively large quantity of volatile thinner.

3. A quickly drying liquid dressing for leather and the like consisting of the following ingredients in the proportions stated: asphaltum—1 gallon, benzin—1 gallon, rubber cement—1 quart, black pigment—1 pound, Japan drier—1 pint, and beeswax—¼ pound.

4. A process of making a dressing for leather and the like comprising heating asphaltum to a temperature not exceeding the boiling point of water, dissolving beeswax therein and adding a black pigment, rubber cement, and Japan drier while the mixture is still hot, cooling and adding benzin to the cold mixture and agitating the mixture to form a homogeneous liquid composition.

5. A quickly drying liquid dressing for leather and the like, comprising a relatively large quantity of asphaltum and a volatile solvent therefor, a relatively small quantity of rubber cement, and a relatively still smaller quantity of black pigment and beeswax.

6. A quickly drying liquid dressing for leather and the like, consisting of a relatively large quantity of asphaltum and a volatile solvent therefor, a relatively small quantity of rubber cement, and a relatively still smaller quantity of black pigment, beeswax and Japan drier.

In testimony whereof I have signed my name to this specification.

ALFRED R. CALDWELL.